(12) United States Patent
Hobmeyr

(10) Patent No.: US 8,053,127 B2
(45) Date of Patent: Nov. 8, 2011

(54) FUEL CELL COOLING TANK ASSEMBLY

(75) Inventor: Ralph T. J. Hobmeyr, Mainz-Kastel (DE)

(73) Assignee: GM Global Technology Operations LLC, Detroit, MI (US)

( * ) Notice: Subject to any disclaimer, the term of this patent is extended or adjusted under 35 U.S.C. 154(b) by 819 days.

(21) Appl. No.: 12/107,870

(22) Filed: Apr. 23, 2008

(65) Prior Publication Data

US 2009/0269638 A1   Oct. 29, 2009

(51) Int. Cl.
*H01M 8/04* (2006.01)
*F16K 17/00* (2006.01)

(52) U.S. Cl. ......... 429/436; 429/437; 429/439; 429/442

(58) Field of Classification Search .................. 429/434, 429/453, 413, 428, 437, 439, 442; 165/279, 165/280; 60/39.281; 137/1, 73, 76, 511
See application file for complete search history.

(56) References Cited

U.S. PATENT DOCUMENTS

| | | | |
|---|---|---|---|
| 6,428,919 B1 | 8/2002 | Takahashi et al. | |
| 6,733,910 B1 * | 5/2004 | Kralick | 429/434 |
| 6,905,792 B2 * | 6/2005 | Imaseki et al. | 429/413 |
| 7,335,435 B2 | 2/2008 | Yamada | |
| 2005/0097880 A1 * | 5/2005 | Jansen | 60/39.281 |
| 2005/0255351 A1 | 11/2005 | Fukuda | |

* cited by examiner

Primary Examiner — Jonathan Crepeau
Assistant Examiner — Kenneth Douyette
(74) Attorney, Agent, or Firm — Reising Ethington P.C.

(57) ABSTRACT

One embodiment of the invention includes a cooling tank reservoir with a pressure release valve and a cooling fluid conduit wrapped around the pressure release valve.

8 Claims, 3 Drawing Sheets

US 8,053,127 B2

FUEL CELL COOLING TANK ASSEMBLY

TECHNICAL FIELD

The field to which the disclosure generally relates includes fuel cell systems, components thereof and more particularly to fuel cell coolant systems, components thereof and methods of making and using the same.

BACKGROUND

Like conventional combustion engine systems, fuel cell systems include a coolant system, which circulates a cooling fluid through a fuel cell stack, for example, through bipolar plates of the fuel cell stack, to control the operating temperature of the fuel cell within a desired temperature range. A radiator removes heat from the coolant. The radiator is connected to a coolant tank reservoir. The radiator may have a pressure valve which opens to allow coolant in the radiator to flow over into the coolant tank reservoir if a certain pressure in the radiator is reached. However, some radiators may not include such a pressure valve. Hydrogen or other gases used as a reactant gas in the fuel cell may make its way into the cooling system and accumulate in the coolant tank reservoir. The cooling tank reservoir may also include a valve designed to release the gases, such as hydrogen accumulated in the headspace of the coolant tank reservoir at a certain pressure.

SUMMARY OF EXEMPLARY EMBODIMENTS OF THE INVENTION

One embodiment of the invention includes a fuel cell system including a fuel cell stack, a cooling system including a radiator connected to the fuel cell stack to circulate coolant there between, a coolant tank reservoir connected to the radiator, to receive overflow of coolant from the radiator, the coolant tank reservoir including a pressure release valve to release hydrogen accumulated in the coolant tank reservoir at a predetermined pressure, the coolant tank reservoir including a wire connected to the valve and a portion of the wire extending into the tank reservoir a distance sufficient to be immersed in cooling fluid in the tank reservoir around the pressure release valve to heat the same.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
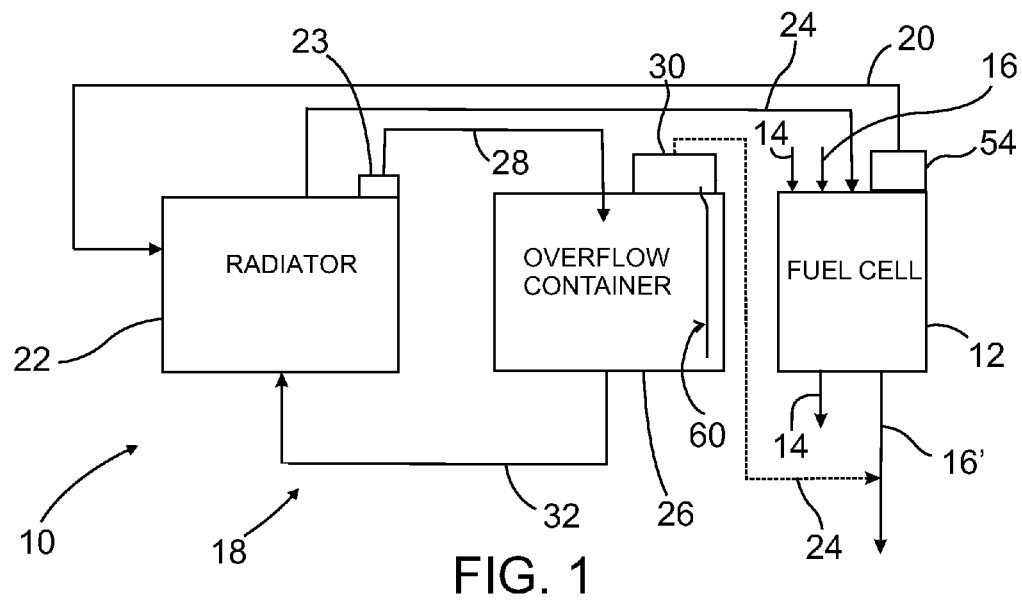
FIG. 1 illustrates a fuel cell system according to one embodiment of the invention.

Referring now to FIG. 1, one embodiment of the invention includes a fuel cell system 10 including a fuel cell stack 12, which includes a plurality of bipolar plates (not shown) through which a cooling fluid may flow to regulate the temperature of the fuel cell stack 12. An anode gas inlet 14 may be provided to flow a fuel such as hydrogen into the fuel cell stack 12 and a cathode inlet 16 may be provided to flow an oxidant, such as oxygen into the fuel cell. An anode exhaust conduit 14' may be provided to exhaust anode side gases from the fuel cell. Similarly, a cathode exhaust conduit 16' may be provided to exhaust cathode side gases from the fuel cell.

A coolant system 18 may be provided including a radiator 22 having a first conduit 20 connected from the fuel cell stack 12 to the radiator 22 to send cooling fluid heated by the fuel cell stack 12 to be cooled by the radiator 22. The fuel cell stack 12 may include a control valve 54 to regulate the flow of the coolant through the first coolant conduit 20. Heat is removed from the coolant by the radiator 22 and the lower temperature coolant is returned to the fuel cell stack 12 by a second coolant conduit 24 that extends between the radiator 22 and the fuel cell stack 12. The radiator 22 may include a pressure release valve 23, which may be constructed and arranged to open when the pressure of the coolant in the radiator reaches a predetermined pressure. When the pressure release valve 23 is open, coolant in the form of liquid and/or gas may flow into an overflow container commonly referred to as a coolant tank reservoir 26 through a third coolant conduit 28. In an alternative embodiment, the radiator 22 does not include a pressure release valve 23. The coolant tank reservoir 26 is sufficiently large enough to receive overflow of coolant from the radiator 22 and to provide head space 53 for the accumulation of gases including hydrogen which may make its way into the coolant system 18. In operation, the pressure in the fuel cell 12 may be higher than in the radiator 22. That may affect hydrogen leakage into the cooling conduits 24 and 20. Because of this possible volume, flow into the cooling system the tank 26 has a valve 30 with a pressure set point lower than the operating pressure of the stack 12.

The coolant tank reservoir 26 may include a pressure release valve 30 constructed and arranged to release gases in the coolant tank reservoir when the pressure in the coolant tank reservoir has reached a predetermined pressure. When the coolant tank reservoir pressure release valve 30 is opened, gas may flow from the coolant tank reservoir to a number of locations including, but not limited to, into the cathode exhaust conduit 16' by way of a degassing conduit 34 connected from the pressure release valve 30 to the cathode exhaust conduit 16'.

The coolant fluid may include, for example but not limited to, water or de-ionized water and glycol. Water vapor from the coolant may accumulate on surfaces of the pressure release valve 30 as will be described in detail hereafter. The water may freeze and cause the pressure release valve 30 to stick and not open.

Figure 2:
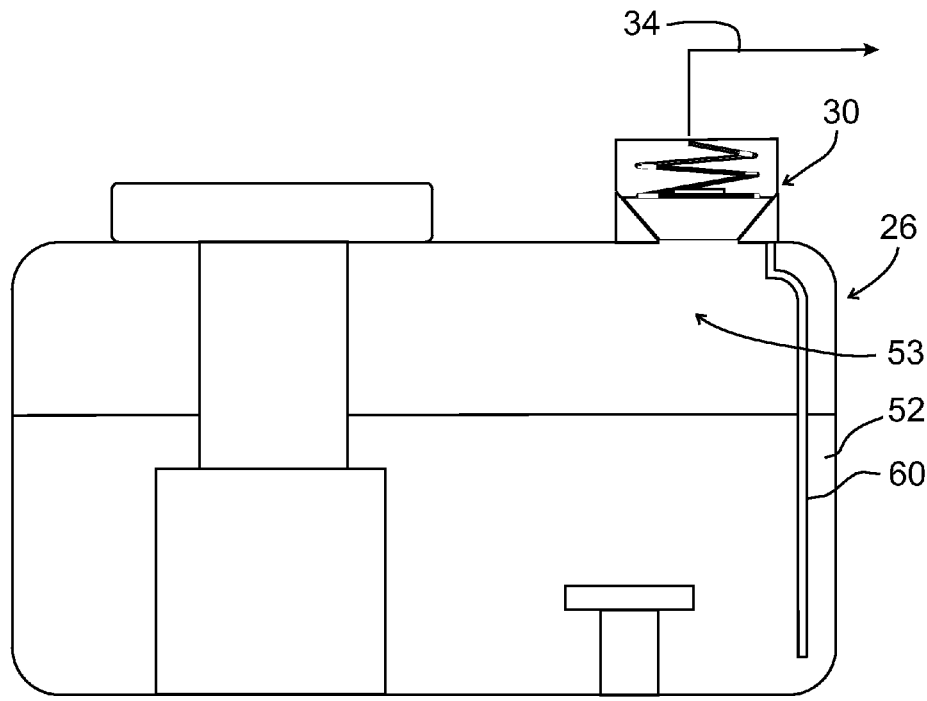
FIG. 2 is a sectional view of a cooling tank reservoir including a pressure release valve and a wire connected to the valve and extending into the reservoir tank according to one embodiment of the invention.

Referring to FIG. 2, one embodiment of the invention includes a heat transfer wire 60 connected to the pressure release valve 30 to heat the same and prevent freezing. In one embodiment, the heat transfer wire 60 extends into the coolant tank reservoir 26 a distance sufficient to have a portion thereof immersed in cooling fluid in the reservoir 26. A fourth coolant conduit 32 may extend from the coolant tank reservoir 26 back to the radiator 22 to charge radiator 22 with cooling fluid accumulated in the coolant tank reservoir 26.

The pressure release valve 30 may be a passive valve that is biased to a closed position. Cooling fluid 52 may be allowed to accumulate in the coolant tank reservoir 26 by discharge of cooling fluid into the reservoir 26 through the open end of the third cooling fluid conduit 28. As indicated previously, the cooling tank reservoir 26 may be sufficiently large enough to provide head room 53 with accumulation of gases.

Figure 3:
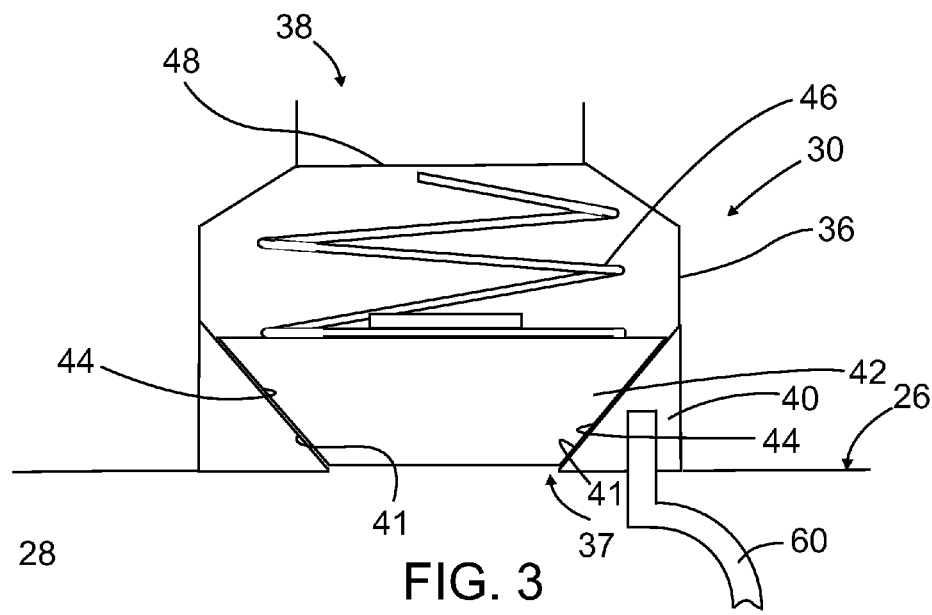
FIG. 3 is an enlarged view of the pressure release valve of the coolant tank reservoir in a closed position.

Referring now to FIG. 3, in one embodiment, the coolant tank reservoir 26 may include a neck portion 36 having a throat having a first open end 37 communicating with the cavity of the reservoir 26 and an open mouth 38, which may be connected to the degassing conduit 34. The pressure release valve 30 may be disposed in the throat 36. In one embodiment, the pressure release valve 30 may include a seat 40 having tapered surfaces 44 and a stopper 42 with mating surfaces 41. Water may accumulate on the surfaces 41 of the stopper 42 and/or surfaces 44 of the seat 40 and freeze, preventing the valve from opening when the pressure in the coolant tank reservoir 26 has reached a predetermined pressure. A spring 46 may be connected to the stopper 42 to bias the stopper 42 against the seat 40 when the pressure in the reservoir is less than a first pressure. The spring 46 may be connected to a support member 48 extending from the throat portion 36. The heat transfer wire 60 may be connected to the valve 30, for example at the seat 40 to prevent freezing.

Figure 4:
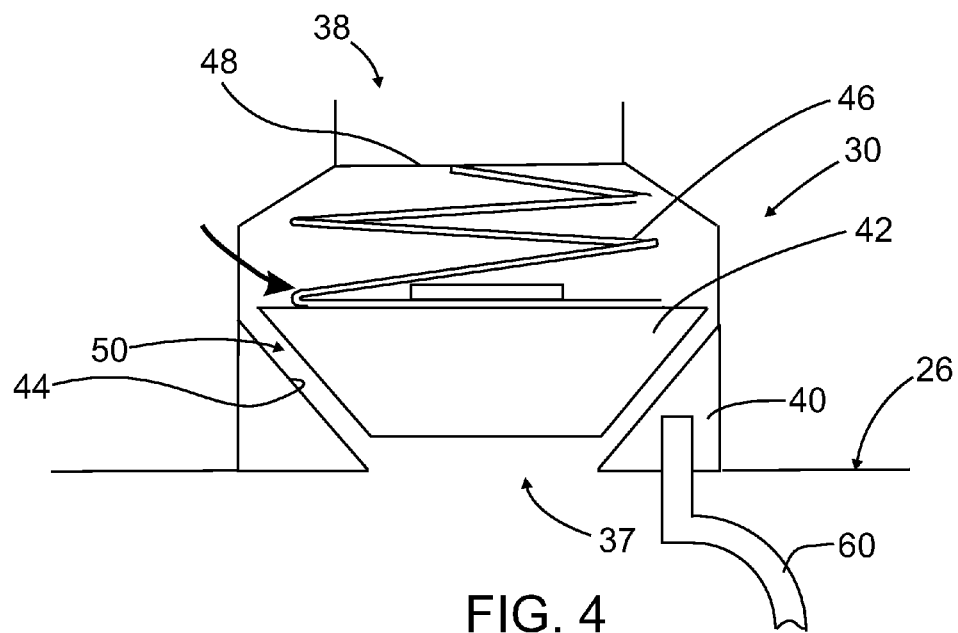
FIG. 4 is an enlarged view of the coolant tank reservoir pressure release valve in an open position according to one embodiment of the invention.

Referring now to FIG. 4, when the pressure in the coolant tank reservoir 26 has reached a predetermined pressure (for example greater than the first pressure), the force of the gas causes the stopper 42 to be moved away from the seat 40 creating a gap 50 between the seat 40 and the stopper 42. The gas may escape the coolant tank reservoir 26 through the open mouth 38. When the pressure is less than the spring force, the stopper 42 is biased by the spring 46 back against the seat 40 closing the valve 30. However, any of a variety of valves including, but not limited to, butterfly, gate or ball valves may be heated by a portion of the cooling system 18 to prevent freezing.

Figure 5:
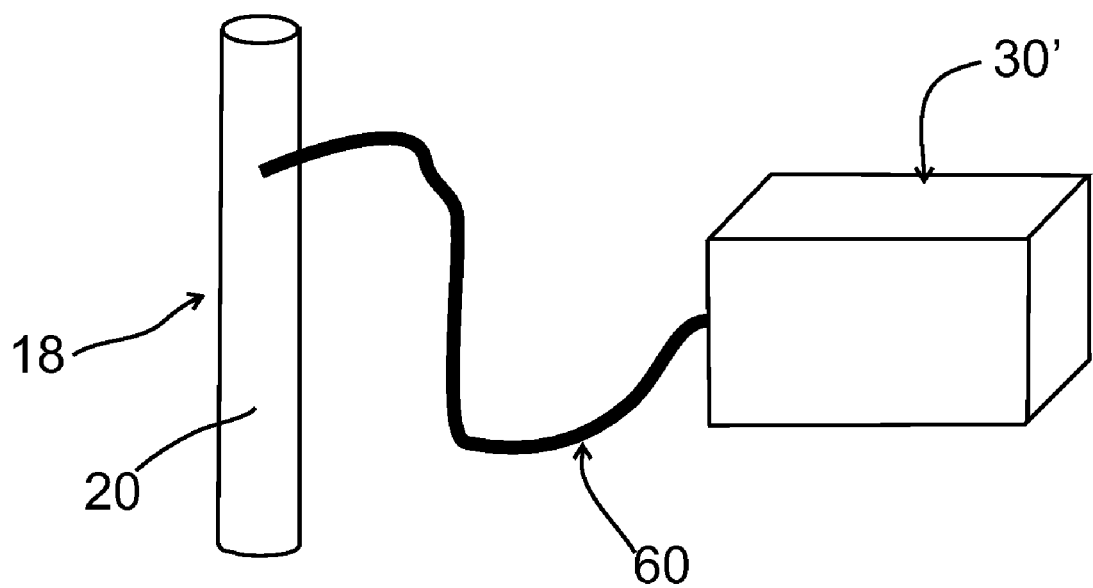
FIG. 5 is an illustration of heated transfer from a fuel cell coolant system to a fuel cell component using a heat transfer wire according to the embodiment of the invention.

FIG. 5 illustrates another embodiment of the invention wherein the heat transfer wire 60 is connected to a portion of the cooling system 18, for example but not limited to conduit 20 to transfer heat to another component 30' of the fuel cell system.

The heat transfer wire 60 typically transports thermal heat from the warm fluid into the valve 30. This thermal heat is general existing in the cooling system, that take the thermal heat out of parts emit thermal heat.

The above description of embodiments of the invention is merely exemplary in nature and, thus, variations thereof are not to be regarded as a departure from the spirit and scope of the invention.

What is claimed is:

1. A product comprising:
a fuel cell coolant tank reservoir having an opening and a pressure release valve constructed and arranged to be in a closed position when the pressure in the tank is less than a first pressure and in an open position when the pressure in the tank is greater than the first pressure, a heat transfer wire connected to the pressure release valve and to a portion of a cooling system to heat the pressure release valve.

2. A product as set forth in claim 1 wherein the heat transfer wire extends into the coolant tank reservoir a distance sufficient for a portion of the wire to be immersed in cooling fluid in the reservoir.

3. A product as set forth in claim 1 wherein the heat transfer wire is connected to a seat of the pressure release valve.

4. A product as set forth in claim 1 further comprising a degassing conduit connected to the pressure release valve and constructed and arranged to allow gas from the cooling tank reservoir to flow through the degassing conduit when the pressure release valve is in the open position.

5. A product as set forth in claim 4 further comprising a fuel cell stack and a cathode side exhaust conduit extending from the fuel cell stack, and wherein the degassing conduit is connected to the cathode side exhaust conduit.

6. A product as set forth in claim 5 further comprising a radiator, a cooling fluid conduit extends from the coolant tank reservoir to the radiator, a first cooling fluid conduit extending from the fuel cell stack to the radiator, and a second cooling fluid conduit extending from the radiator to the fuel cell stack to return coolant fluid to the fuel cell stack.

7. A product as set forth in claim 6 wherein the radiator includes a second pressure release valve constructed and arranged to open when the pressure of the cooling fluid in the radiator reaches a predetermined level and to allow cooling fluid and gases to flow from the radiator to the coolant tank reservoir through the cooling fluid conduit.

8. A product comprising a fuel cell system comprising a fuel cell stack and a cooling system constructed and arranged to cool a fuel cell stack, the cooling system comprising a radiator connected to a cooling tank reservoir, the cooling tank reservoir comprising a pressure release valve, and a heat transfer wire connected to the pressure release valve and another portion of the cooling system to transfer heat from the cooling system to the pressure release valve.

* * * * *